Patented May 15, 1951

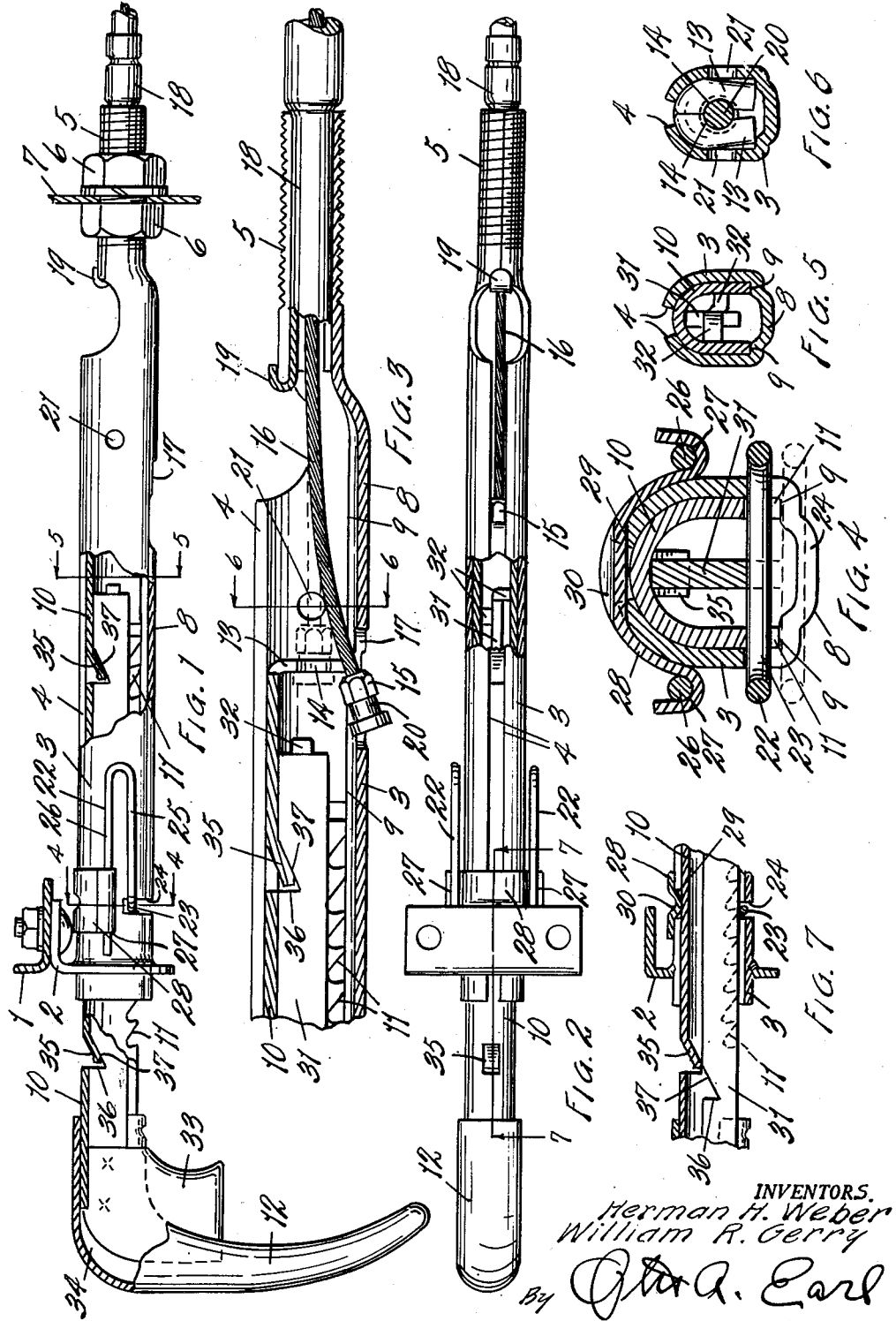

2,553,025

UNITED STATES PATENT OFFICE 2,553,025

REMOTE CONTROL DEVICE FOR BRAKES AND THE LIKE

Herman H. Weber and William R. Gerry, Kalamazoo, Mich., assignors to Shakespeare Products Company, Kalamazoo, Mich.

Application November 2, 1949, Serial No. 124,956

12 Claims. (Cl. 74—502)

This invention relates to improvements in remote control device for brakes and the like.

The main objects of this invention are:

First, to provide a control device which is well adapted for the controlling of brakes and the like and is strong and rigid and one in which the movable parts are effectively supported in their coacting relation.

Second, to provide a control device in which the parts are quite easily fabricated and assembled.

Third, to provide a control device in which the adjusting member is easily moved or adjusted within its support and at the same time is securely retained in adjusted position.

Objects relating to details and economies of the invention will appear from the description to follow. The invention is pointed out in the claims.

A preferred embodiment of the invention is illustrated in the accompanying drawings, in which:

Fig. 1 is a fragmentary side elevational view of a control device embodying our invention, parts being broken away and shown in longitudinal section.

Fig. 2 is a fragmentary top plan view with parts broken away and shown in longitudinal section.

Fig. 3 is an enlarged fragmentary view partially in longitudinal section disclosing certain of the steps in assembling the transmission element with the adjusting member.

Fig. 4 is an enlarged transverse section on a line corresponding to line 4—4 of Fig. 1.

Fig. 5 is a transverse section on a line corresponding to line 5—5 of Fig. 1.

Fig. 6 is a transverse section on a line corresponding to line 6—6 of Fig. 3 after the transmission element has been secured to the adjusting member.

Fig. 7 is a fragmentary view in longitudinal section on a line corresponding to line 7—7 of Fig. 2 with the control rod or detent releasing member in detent releasing position.

In the accompanying drawing 1 represents part of a motor vehicle or other support on which the bracket 2 of the support member 3 is mounted. The support member 3 is, in the embodiment illustrated, formed from sheet stock and is generally elongated and tubular although the edges 4 of the stock forming the body portion of the support member are not completely abutted. The support member is provided with a tubular extension 5 at its rear end externally threaded to receive the nuts 6 for clamping to the support 7 which is commonly the dash or a front wall portion of a vehicle body. The bottom portion 8 of the support member 3 is in the embodiment illustrated stepped to provide longitudinal ways 9 slidably receiving the edges of the channel shaped adjusting member 10 which telescopes within the support member and being desirably of such dimensions as to provide a freely sliding fit therein (see Figs. 4 and 5).

The adjusting member is provided with series of rearwardly facing ratchet teeth 11 on the edge of each of its flanges. The adjusting member is provided with a grip 12 at its outer end and has inturned opposed lugs 13 at its inner end, these lugs having opposed recesses 14 in their inner edges adapted to receive the coupling head 15 of the flexible transmission element 16. The bottom wall of the support member is provided with an opening 17 through which the head 15 may be disposed in assembling. The tubular extension 5 of the support member is adapted to receive the adapter 18 of the transmission cable which is provided with a retaining lug 19 at its front end bent upwardly and rearwardly after the adapter has been inserted to retain the adapter in assembled relation to the support member. With the parts thus engaged the coupling head of the transmission element 16 is disposed through the opening 17, the adjusting member adjusted so that the head may be positioned with its reduced portions 20 between the lugs and the lugs upset to the position shown in Fig. 6 by means of tools inserted through openings 21 in the sides of the support member.

The adjusting member is retained in its adjusted positions by means of the springable detent 22 preferably formed of spring wire and bent into U-shape. The bight 23 of the detent is disposed in the transverse downwardly facing slot 24 adjacent the front end of the support member. The arms 25 of the detent are U-shaped or return bent, their ends 26 being engaged with the upwardly facing seats 27 in the saddle 28 arranged on the support member. The support member is provided with a notch 29 receiving the inset lug portion 30 of the saddle thereby preventing longitudinal movement of the saddle support member. This provides a very simple mounting for the detent which coacts with the teeth of the adjusting member to hold the same against rearward movement and at the same time the detent freely ratchets over the teeth when the adjusting member is drawn forwardly to apply stress to actuate the transmission element 16.

The detent is controlled by a control rod 31 slidably supported within the adjusting member. In the embodiment illustrated this control rod is formed of flat stock and has laterally disposed lugs 32 at its rear end holding the rear end of the control rod in centered relation to the adjusting member (see Fig. 5). The front end of the control rod is provided with a finger piece 33 slidable within a recess 34 provided therefor in the grip 12. To actuate the control rod to detent releasing position when the finger piece is actuated, the adjusting member is provided with tongue-like cams 35 struck in from the web thereof (see Fig. 1). The control rod is provided with notch-like recesses 36 receiving these tongues when the control rod is in retracted position and provided with cam surfaces or elements 37 coacting with the cam elements 35 to move the control rod downwardly and thus disengage the detent. As soon as the control rod is released the detent, with the coacting cam elements of the adjusing member and control rod, returns the control rod to detent releasing position. The actuated position of the control rod is shown in Fig. 7.

With the parts thus formed and arranged they may be economically produced and very rapidly assembled and the structure is very strong and rigid. The transmission element can be readily connected to the adjusting member after the device has been mounted on a vehicle although it may be completely assembled as a unit for attachment of the transmission member to the part controlled prior to mounting if that is desired. The procedure depends somewhat on the particular installations or the desires of the assembler.

We have illustrated and described our invention in a highly practical commercial embodiment thereof. We have not attempted to illustrate other adaptations which we contemplate as it is believed that this disclosure will enable those skilled in the art to embody or adapt our invention as may be desired.

Having thus described our invention, what we claim as new and desire to secure by Letters Patent is:

1. In a control device, the combination of an elongated tubular support member, said support member having a transverse downwardly opening slot adjacent its front end, an adjusting member of downwardly facing channel section telescoping within said support member, the edges of its flanges being provided with rearwardly facing ratchet teeth, said adjusting member being provided with a grip at its front end and inturned lugs at its rear end, a U-shaped springable detent disposed with its bight within said transverse slot of said support member to coact with the teeth of said adjusting member and with its arms disposed at the sides of the support member and supportedly connected thereto, a control rod slidable within said adjusting member and having a finger piece associated with said grip, said adjusting member having longitudinally spaced cam elements, said control rod being provided with notch-like recesses receiving said cam elements when the control rod is in retracted position and having cam portions coacting with the cam elements of said adjusting member for actuating said control rod to detent releasing position when the control rod is actuated, said springable detent acting to retract said control rod when it is released, and a transmission element provided with a grooved coupling head engageable between said inturned lugs on the rear end of said adjusting member, said support member having a slot in the bottom thereof through which said coupling head may be disposed to facilitate the engagement of the coupling head with said lugs on said adjusting member, said support member having opposed openings in the sides thereof facilitating the closing of the lugs upon the coupling head.

2. In a control device, the combination of an elongated tubular support member having a downwardly facing opening adjacent its front end, an adjusting member of downwardly facing channel section telescoping within said support member, the edges of the flanges of said adjusting member having rearwardly facing ratchet teeth, said adjusting member being provided with a grip at its front end, a U-shaped springable detent having U-shaped arms disposed with its bight within said downwardly facing opening of said support member to coact with the teeth of said adjusting member and having its arms disposed at the sides of the support member, a saddle disposed on said support member and with which the ends of said detent arms are engaged, said saddle and support member being provided with coacting anchoring notches and lugs for restraining said saddle against movement longitudinally on said support, said detent acting to hold said saddle upon said support member, and a control rod slidable within said adjusting member and having a finger piece associated with said grip, said control rod and adjusting member being provided with coacting cam elements whereby the control rod is actuated to release the springable detent when the control rod is retracted, said cam elements and springable detent coacting to return the control rod to detent releasing position when the control rod is released.

3. In a control device, the combination of an elongated tubular support member having a downwardly facing opening adjacent its front end, an adjusting member of downwardly facing channel section telescoping within said support member, the edges of the flanges of said adjusting member having rearwardly facing ratchet teeth, said adjusting member being provided with a grip at its front end, a U-shaped springable detent disposed with its bight within said downwardly facing opening of said support member to coact with the teeth of said adjusting member and having its arms mounted at the sides of the support member, and a control rod slidable within said adjusting member and having a finger piece associated with said grip, said control rod and adjusting member being provided with coacting cam elements whereby the control rod is actuated to release the springable detent when the control rod is retracted, said cam elements and springable detent coacting to return the control rod to springable detent releasing position when the control rod is released.

4. In a control device, the combination of a tubular support member having an opening therein, an adjusting member of channel section telescoping within said support member, the edges of the flanges of said adjusting member being provided with rearwardly facing ratchet teeth, said adjusting member being provided with a grip at its front end, the rear end of said adjusting member being adapted for the connection of a transmission element thereto, a U-shaped springable detent disposed with its bight within said downwardly facing opening of said support member to coact with the teeth of said adjusting member and with its arms at the sides of the support member, a saddle disposed on said support member in which the ends of said arms are engaged whereby the springable detent is supported under spring stress, and a control rod slidable within said adjusting member and provided with a finger piece.

5. In a control device, the combination of a support member, an adjusting member of channel section telescoping within said support member, the edges of the flanges of said adjusting member being provided with rearwardly facing ratchet teeth, said adjusting member being provided with a grip at its front end, the rear end of said adjusting member being adapted for the connection of a transmission element thereto, a spring biased detent mounted on said support member to coact with the teeth of said adjusting member, a control rod slidable within said adjusting member and provided with a finger piece, said adjusting member having longitudinally spaced tongue-like cam elements, said control rod being provided with recesses receiving said cam elements when the control rod is in normal position and having cam portions coacting with the cam elements and the adjusting member for actuating said control rod to detent releasing position when the control rod is actuated.

6. In a control device, the combination of a tubular support member, an adjusting member slidable within said support member and having rearwardly facing ratchet teeth, said adjusting member being provided with a grip at its front end, a spring biased detent mounted on said control member to coact with said ratchet teeth of said adjusting member, and a control rod slidably associated with said adjusting member and having a finger piece associated with said grip for simultaneous gripping therewith, said control rod and adjusting member having coacting cam elements acting to release the detent when the control rod is actuated, said spring biased detent coacting with the control rod to retract the control rod and permit re-engagement of the detent when the control rod is released.

7. In a control device, the combination of a tubular support member, an adjusting member slidable within said support member and having rearwardly facing ratchet teeth, said adjusting member being provided with a grip at its front end, a spring biased detent mounted on said support member to coact with said ratchet teeth of said adjusting member, and a detent releasing rod slidably associated with said adjusting member and having a finger piece associated with said grip for simultaneous gripping therewith.

8. In a control device, the combination of an elongated support member, an adjusting member of channel section telescopingly associated with said support member, the edges of the flanges of said adjusting member having rearwardly facing ratchet teeth, said adjusting member being provided with a grip at its outer end, a spring biased detent mounted on said support member to coact with the teeth of said adjusting member, and a detent releasing rod slidable within said adjusting member and having a finger piece associated with said grip.

9. In a control device, the combination of an elongated support having a detent receiving opening therein, an adjusting member telescoping within said support and having rearwardly facing ratchet teeth, a spring biased detent mounted on said support member to engage the teeth of said adjusting member through the opening in said support member, and a control rod slidably associated with said adjusting member, said adjusting member having a grip at its outer end and said control rod having a finger piece associated with said grip.

10. In a control device, the combination of an elongated tubular support member, the bottom of said support member being stepped to provide longitudinal upwardly facing slideways, said support member having a transverse downwardly opening slot adjacent its front end, an adjusting member of downwardly facing channel section telescoping within said support member with the edges of its flanges slidable on said slideways and provided with rearwardly facing ratchet teeth, said adjusting member being provided with a grip at its front end, a U-shaped springable detent having U-shaped arms disposed with its bight within said transverse slot of said support member to coact with the teeth of said adjusting member and with its U-shaped arms disposed at the sides of the support member and extending longitudinally thereof, a saddle disposed on said support member and with which the ends of said U-shaped arms of said detent are engaged, said support member and saddle being provided with coacting notches and lugs whereby the saddle is restrained against longitudinal movement on said support member, said springable detent acting to hold said saddle upon said support member, a control rod slidable within said adjusting member and having a finger piece slidably associated with said grip, said adjusting member having longitudinally spaced cam elements struck inwardly from the web portion thereof, said control rod being provided with notch-like recesses receiving said cam elements when the control rod is in retracted position and having cam portions coacting with the cam elements of said adjusting member for actuating said control rod to detent releasing position when the control rod is actuated, said springable detent acting to retract said control rod when it is released.

11. In a control device, the combination of an elongated tubular support member, said support member having a transverse downwardly opening slot adjacent its front end, an adjusting member of downwardly facing channel section telescoping within said support member and provided with rearwardly facing ratchet teeth, said adjusting member being provided with a grip at its front end, a U-shaped springable detent having U-shaped arms disposed with its bight within said transverse slot of said support member to coact with the teeth of said adjusting member and with its U-shaped arms disposed at the sides of the support member and extending longitudinally thereof, a saddle disposed on said support member and with which the ends of said U-shaped detent arms of said detent are engaged, said support member and saddle being provided with coacting notches and lugs whereby the saddle is restrained against longitudinal movement on said support member, said springable detent acting to hold said saddle upon said support member, a control rod slidable within said adjusting member and having a finger piece slidably associated with said grip, said adjusting member having longitudinally spaced cam elements struck inwardly from the web portion thereof, said control rod being provided with notch-like recesses receiving said cam elements when the control rod is in retracted position and having cam portions coacting with the cam elements of said adjusting member for actuating said control rod to detent releasing position when the control rod is actuated, said springable detent acting to retract said control rod when it is released.

12. In a control device, the combination of an elongated tubular support member, said support member having a transverse downwardly opening slot adjacent its front end, an adjusting member of downwardly facing channel section telescoping within said support member and provided with rearwardly facing ratchet teeth, the sides of said adjusting member having inturned notched lugs at their rear ends, said adjusting member being provided with a grip at its front end, a U-shaped springable detent having U-shaped arms disposed with its bight within said transverse slot of said support member to coact with the teeth of said adjusting member and with its arms disposed at the sides of the support member and extending longitudinally thereof, a saddle disposed on said support member and with which the ends of said U-shaped detent arms are engaged, said support member and saddle being provided with coacting notches and lugs whereby the saddle is restrained against longitudinal movement on said support member, said springable detent acting to hold said saddle upon said support member, a control rod slidable within said adjusting member and having a finger piece slidably associated with said grip, said adjusting member having longitudinally spaced cam elements struck inwardly from the web portion thereof, said control rod being provided with notch-like recesses receiving said cam elements when the control rod is in retracted position and having cam portions coacting with the cam elements of said adjusting member for actuating said control rod to detent releasing position when the control rod is actuated, said springable detent acting to retract said control rod when it is released, and a transmission element provided with a grooved coupling head engageable between said inturned notched lugs on said adjusting member, said support member having a slot in the bottom thereof through which said coupling head may be disposed to facilitate the engagement of the coupling head with said inturned notched lugs, said support member having opposed openings in the sides thereof facilitating the closing of the said inturned notched lugs upon the coupling head.

HERMAN H. WEBER.
WILLIAM R. GERRY.

REFERENCES CITED

The following references are of record in the file of this patent:

UNITED STATES PATENTS

| Number | Name | Date |
|---|---|---|
| 2,177,456 | Irving | Oct. 24, 1937 |
| 2,256,696 | Weber | Sept. 23, 1941 |
| 2,377,691 | Jandus | June 5, 1945 |

FOREIGN PATENTS

| Number | Country | Date |
|---|---|---|
| 516,309 | Great Britain | Dec. 29, 1939 |